July 23, 1968 H. SEIDEL 3,394,318

PARALLEL-CONNECTED SYNCHRONIZED POWER SOURCES

Filed Sept. 30, 1965 2 Sheets-Sheet 1

INVENTOR
H. SEIDEL
BY
Sylvan Sherman
ATTORNEY

PARALLEL-CONNECTED SYNCHRONIZED POWER SOURCES

Filed Sept. 30, 1965 2 Sheets-Sheet 2

United States Patent Office 3,394,318
Patented July 23, 1968

3,394,318
PARALLEL-CONNECTED SYNCHRONIZED POWER SOURCES

Harold Seidel, Fanwood, N.J., assignor to Bell Telephone Laboratories, Incorporated, New York, N.Y., a corporation of New York Filed Sept. 30, 1965, Ser. No. 491,706
5 Claims. (Cl. 330—124)

ABSTRACT OF THE DISCLOSURE

This application relates to arrangements for synchronizing and stabilizing a plurality of similar, parallel-connected wavepaths. As described, the input ends and the output ends of the wavepaths are substantially terminated for all higher order modes by means of common resistive cards whose resistance per square is equal to the TEM mode wave impedance $$\sqrt{\frac{\mu}{\epsilon}}$$

Figure 1:
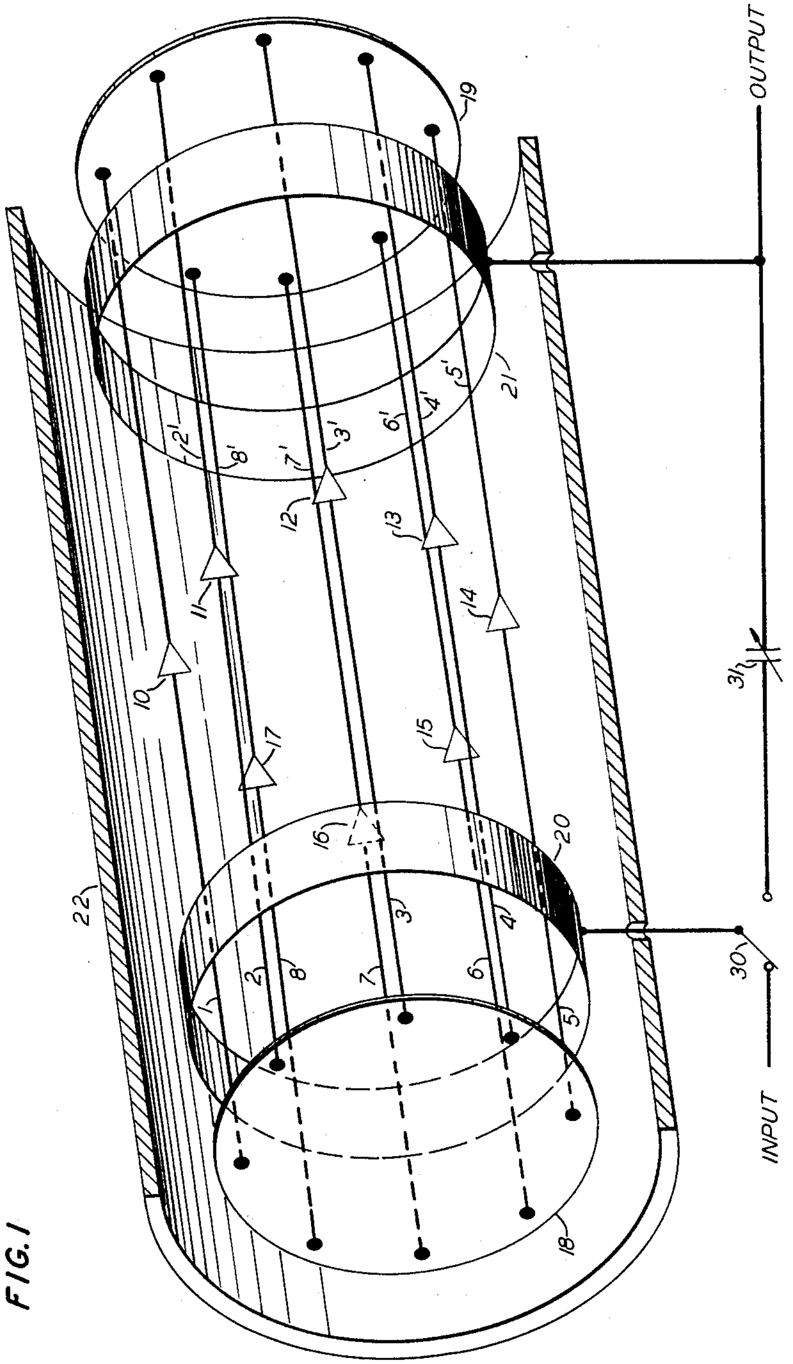

of each wavepath. Equal components of signal are reactively coupled into and out of each wavepath in time phase. All spurious, out-of-space phase and out-of-time phase components, on the other hand, are dissipated in the resistive terminations.

Amplifiers constructed in the manner described are unconditionally stable at all frequencies regardless of any asymmetry in the several wavepaths.

This invention relates to arrangements for synchronizing and stabilizing a plurality of parallel-connected amplifiers and oscillators.

Until very recently, the utilization of many solid-state active circuit components, such as transistors and tunnel diodes, for example, has been limited to low power applications. This was due to the low power handling capability of such devices and their relatively high cost which discouraged their use in large numbers as a means of overcoming their limited power handling capacity. Recently, however, there has been a dramatic reduction in the cost of many solid state devices which, in turn, now makes it commercially feasible to use them in relatively large numbers.

The technical problems associated with operating large numbers of active elements in a parallel array are problems of synchronization and stabilization. Stating the problems briefly, the many independent active elements must be synchronized so as to cooperate in a manner to produce maximum output power for the desired mode of operation while, at the same time, the active elements must be incapable of cooperating at all other possible modes of operation.

In the copending application by M. DiDomenico and H. Seidel, Ser. No. 490,985, filed Sept. 28, 1965, and assigned to applicant's assignee, the basic principle of stable synchronization was stated as follows:

The organized state of a dynamic system must be highly distinguished from all the possible unorganized states and, further, it must offer so compelling an advantage to system function that the power sources accept the loss of the degrees of freedom of their independent operation and accept a collective interaction.

In accordance with the present invention, the preferred mode is an in-phase mode. That is, the desired signal is coupled into and out of a plurality of parallel-connected amplifiers in time phase. Any out-of-phase modes, induced in the individual parallel branches of the system due to any asymmetry, are distinguished and dissipated in a suitable resistive load. Thus, there is no ability for the individual branches of the system to cooperate with each other except in the in-phase mode.

In one illustrative embodiment of the invention, to be described in greater detail hereinbelow, the input and output terminals of a parallel array of amplifiers are capacitatively coupled to a pair of unipotential conductive rings. In addition, the input and output terminals, respectively, of the array are separately terminated by means of a pair of resistive cards. So arranged, the individual amplifiers are energized in time phase and couple out of the system to the output ring in time phase. On the other hand, all spuriously generated, out-of-phase signal components are dissipated in the resistive terminations.

It is advantageous that all of the circuits be similar, and that the system be symmetrically arranged so as to minimize the power dissipation in the system. However, as the system is designed with the specific purpose of rendering harmless the consequences of asymmetry and imbalance, the degree of symmetry is a matter of choice, to be made consistent with all other design considerations such as cost, size, et cetera.

Figure 2:
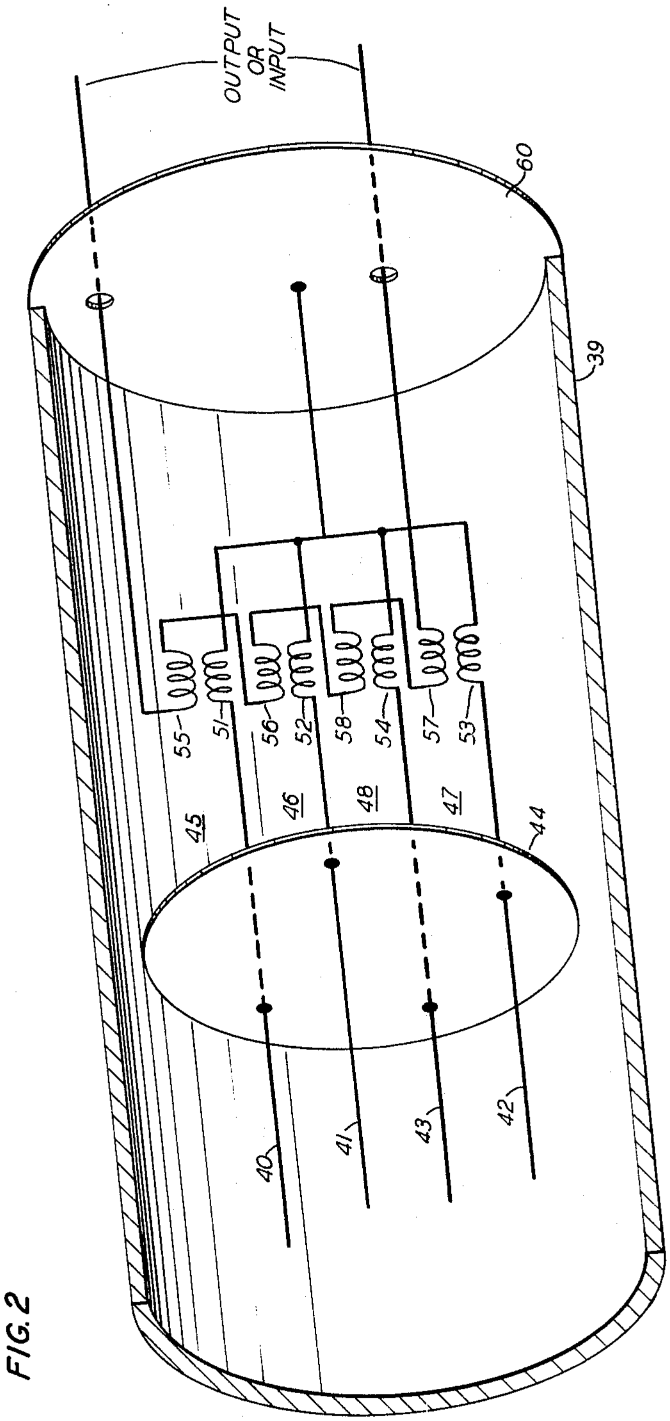

The various features and other advantages of the invention will appear more fully from the following detailed description of the illustrative embodiment of the invention shown in the accompanying drawings, in which:

FIG. 1 is a first embodiment of the invention utilizing capacitative coupling; and FIG. 2 shows the use of inductive coupling in place of the capacitive coupling used in FIG. 1.

Referring to the drawings, FIG. 1 shows a first illustrative embodiment of the invention comprising a plurality of parallel-connected amplifier circuits and means for coupling into and out of said amplifiers. The amplifiers, designated 10 through 17 are symmetrically disposed in a "birdcage" or circular array. The amplifiers can be of any variety including, but not limited to, amplifiers using transistors, tunnel diodes, or vacuum tubes.

The input ends of the amplifiers are conductively connected, by means of input conductors 1 through 8, to a first, mutual resistive terminating card 18, which separately terminates all the input conductors. In a similar manner, the output ends of the amplifiers are conductively connected, by means of output conductor 1′ through 8′, to a second, substantially identical, mutual resistive terminating card 19, which separately terminates all the output conductors.

Signal energy is capacitatively coupled into amplifiers 10 through 17 by means of a circular, low-loss conductive ring 20 which surrounds input conductors 1 through 8. Advantageously, ring 20 is located immediately adjacent to terminating card 18 or approximately multiples of half a wavelength away from terminating card 18, and has a width which is no greater than a quarter of a wavelength. The wavelength referred to is the wavelength of the input signal.

A second low-loss conductive ring 21, located at the output end of the amplifiers, capacitatively couples signal wave energy out of the system. Advantageously, ring 21 is similarly located immediately adjacent to terminating card 19 or approximately multiples of half a wavelength away from card 19, and has a width which is no greater than a quarter of a wavelength. The circumferences of both rings 20 and 21 are made small relative to a wavelength at the frequency of interest so that both rings appear as equipotential surfaces at the operating frequency.

The entire array of amplifiers and conductors is surrounded by a cylindrical conductive enclosure 22 to form, in association with conductors 1 through 8 and conductors 1′ to 8′, a plurality of paraxial transmission lines which propagate wave energy in the TEM mode.

Not shown in FIG. 1 are the various structural members for supporting and spacing the circuit elements. In practice, the power dividing network including the coupling rings and the input and output conductors would typically be encased in a low-loss dielectric material, or otherwise supported in accordance with those techniques well known in the coaxial cable art.

In an ideal system, in which all of the amplifiers are perfectly identical and in which perfect circuit symmetry exists, the signal wave components coupled onto each of the input conductors 1 through 8, by way of input ring 20, are equal in amplitude and are in time phase. These identical signals are amplified and then capacitatively coupled from output conductors 1' through 8' to the output ring 21 as a plurality of in-phase signals of equal amplitude.

Under these idealized conditions, wherein the signal components on the input conductors 1 to 8 and on the output conductors 1' to 8' are the same, there is no net voltage difference between any of the respective input and output conductors. As a result, no currents flow in either of the resistive terminating cards 18 or 19, and substantially all of the input power delivered by way of input ring 20, is amplified and leaves the system by way of output ring 21.

It is recognized, however, that due to differences among the amplifiers, and asymmetry in the structure, the voltages produced on the several input and output conductors may not all be equal. These imbalances produce a net voltage difference among the several input and output conductors which causes currents to flow in the resistive terminating cards 18 and 19. By making the card impedances equal to $$\sqrt{\frac{\mu}{\epsilon}}$$

ohms per square, where $\mu$ is the permeability of the medium surrounding the conductors and $\epsilon$ the permittivity of the medium, (377 ohms per square in air), each of the paraxial lines, formed by the respective conductors and enclosure 22, is match terminated, and all of the power represented by any voltage imbalance is dissipated in cards 18 and 19.

As an example, let us consider a two path system for which the complex voltage on one of the output conductors is $E_1$, while the complex voltage on another output conductor is $\vec{E}_2$, different than $\vec{E}_1$.

Voltages $\vec{E}_1$ and $\vec{E}_2$ can be expressed as the sum and difference voltages, $$\vec{E}_1=\tfrac{1}{2}(\vec{E}_1+\vec{E}_2)+\tfrac{1}{2}(\vec{E}_1-\vec{E}_2)$$

and $$\vec{E}_2=\tfrac{1}{2}(\vec{E}_1+\vec{E}_2)-\tfrac{1}{2}(\vec{E}_1-\vec{E}_2)$$

Upon examination of these expressions, it is seen that each voltage consists of two components, $\tfrac{1}{2}(\vec{E}_1+\vec{E}_2)$ and $\tfrac{1}{2}(\vec{E}_1-\vec{E}_2)$. In addition, it is seen that for both signals the first of these components, $\tfrac{1}{2}(\vec{E}_1+\vec{E}_2)$, are in phase. As a result they produce no net voltage difference at the line terminating card and, hence, no current flows in the card and no power is dissipated. Instead, they couple to output ring 21 and induce therein an output signal.

The second of these components, on the other hand, are 180 degrees out of phase, as evidenced by the negative sign in front of one of them. As a result they produce a net voltage between the two paths at the line terminating card equal to $(\vec{E}_1-\vec{E}_2)$, which results in a current flow and power dissipation. In addition, because of their out-of-phase relationship, they induce no net voltage in the output ring 21.

Stated more generally, the structure shown in FIG. 1 is capable of transmitting wave energy in only the in-phase mode. All out-of-phase modes are absorbed in the transverse terminating resistance cards which are totally absorbing black bodies to the out-of-phase modes. It is a further advantage of the invention that the out-of-phase modes are terminated, and totally absorbed, at all frequencies, thereby rendering the amplifier array unconditionally stable, both within the frequency range of interest as well as without the operating frequency range. This comes about because of the complete isolation of each of the parallel branches of the system for all modes other than the in-phase mode. Thus, any mismatch to the in-phase mode, because of the relatively narrow bandwidth performance of the capacitive coupler, produces only a minor effect. Spontaneous oscillation starting in any one path produces energy into all modes and that proportion in the in-phase mode is relatively negligible. Reflections, therefore, are not substantially regenerated.

The amplifier structure of FIG. 1 can readily be converted into a single mode oscillator by feeding back to the input of the amplifier a portion of the output signal. This is done in the illustrative embodiment by means of a switch 30 which couples the output ring 21 to the input ring 20 through a variable capacitor 31. The latter is adjusted to satisfy the well-known amplitude and phase criteria for oscillations.

FIG. 2 is an alternative arrangement utilizing inductive coupling instead of the capacitive coupling used in the embodiment of FIG. 1. For purposes of illustration, only a portion of a four path system is shown, including the four conductors 40, 41, 42 and 43, a surrounding conductive cylinder 39, a terminating resistive card 44, and four substantially identical transformers 45, 46, 47 and 48. The transformers are used in lieu of the rings of FIG. 1 to produce in-phase coupling.

As in the embodiment of FIG. 1, all of the conductors 40, 41, 42 and 43 are terminated by the resistive card 44. In addition, each conductor 40, 41, 42 and 43 is connected respectively to one end of the primary windings 51, 52, 53 and 54 of transformers 45, 46, 47 and 48. The other ends of the primary windings are connected to the outer conductor 39 by way of conductive plate 60.

The secondary windings 55, 56, 57 and 58 of the transformers are connected series-aiding. External connection to an input or output circuit is made across the series-connected secondary windings.

When used as an input circuit, a signal applied across the series-connected secondary windings induces in-phase voltages in the four paths. When used as an output circuit, in-phase voltages on the four conductors induce in-phase signal components in the secondary windings which add in time phase to produce the output signal. Out-of-phase voltages, on the other hand, induce opposing voltages in the secondary windings which sum to zero. With respect to the out-of-phase voltages, the transformers appear as open circuits across resistive card 44. Hence, all the power associated with these signal components is dissipated in the resistive termination.

While the invention has been explained with reference to particular structures and with reference to amplifiers and oscillators, it should be understood that the principles of the invention are applicable to any situation which requires that many paths be connected in parallel and wherein conditions for the generation of spurious oscillations or other types of multimode operation would be possible, but undesirable. Similarly, the above-described coupling arrangements are illustrative of only two of the many possible specific embodiments which can represent applications of the principles of the invention. Numerous and varied other arrangements can readily be devised in accordance with these principles by those skilled in the art without departing from the spirit and scope of the invention.

What is claimed is:

1. In combination:
a plurality of separate wavepaths having input ends and output ends;
a first mutual resistive element connecting the input end of each wavepath to the input end of every other wavepath;
a second mutual resistive element connecting the output end of each wavepath to the output end of every other wavepath;
a first coupling means for simultaneously coupling equal wave energy into the input ends of all of said wavepaths in time phase;
and second coupling means for simultaneously extracting in time phase equal wave energy from the output ends of all of said wavepaths;
said coupling being effected such that no in-phase components of wave energy are dissipated in either of said resistive elements.

2. The combination according to claim 1 wherein each of said coupling means comprises a low-loss conductive ring capacitatively coupled to said wavepaths.

3. The combination according to claim 1 wherein each of said coupling means comprises a plurality of substantially identical transformers each having a primary winding and a secondary winding;
wherein the corresponding end of each of said primary windings is connected respectively to one of said wavepaths and the other ends of said primary windings are connected in common;
and wherein said secondary windings are connected series-aiding.

4. In combination:
a plurality of separate, substantially identical amplifiers, symmetrically disposed in a circular array;
the input end of each of said amplifiers being separately match-terminated by means of a first common resistance which connects the input end of each amplifier to the input end of every other amplifier;

the output end of each of said amplifiers being separately match-terminated by means of a second common resistance which connects the output end of each amplifier to the output end of every other amplifier;
means for inducing substantially equal in-phase signals at the input ends of said amplifiers;
and means at the output ends of said amplifiers for coupling in-phase signal wave energy out of said amplifiers.

5. In an electromagnetic wave transmission system, a coupler comprising:
a first circuit;
a plurality of two-conductor circuits in which one conductor of each is shared in common;
a mutual resistive card having a resistance equal to $$\sqrt{\frac{\mu}{\epsilon}}$$

ohms per square connecting one end of the other conductor of each of said circuits to one end of the other conductor of every other circuit, where $\mu$ and $\epsilon$ are the permeability and permittivity respectively of the medium between said conductors;
said circuits being open-circuited at their other end;
and means for reactively coupling substantially equal in-phase signals between said first circuit and said plurality of circuits.

References Cited

UNITED STATES PATENTS

| | | | |
|---|---|---|---|
| 2,782,379 | 2/1957 | Diambra et al. | 333—9 X |
| 2,915,712 | 12/1959 | Tice et al. | 333—8 |
| 3,336,540 | 8/1967 | Kwartiroff et al. | 333—28 |

ROY LAKE, *Primary Examiner.*

J. B. MULLINS, *Assistant Examiner.*